US011275555B1

(12) United States Patent
Wheless et al.

(10) Patent No.: US 11,275,555 B1
(45) Date of Patent: Mar. 15, 2022

(54) RESOLVING A DEVICE PROMPT

(71) Applicant: KYNDRYL, INC., New York, NY (US)

(72) Inventors: Sharon Wheless, Manteo, NC (US); Zachary A. Silverstein, Jacksonville, FL (US); Jacob Ryan Jepperson, St Paul, MN (US); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/996,972

(22) Filed: Aug. 19, 2020

(51) Int. Cl.
*G06F 3/048* (2013.01)
*G06F 3/16* (2006.01)

(52) U.S. Cl.
CPC .................... *G06F 3/167* (2013.01)

(58) Field of Classification Search
CPC ................. G06F 3/165; G06F 3/167
See application file for complete search history.

(56) References Cited

U.S. PATENT DOCUMENTS

| 5,899,972 | A | 5/1999 | Miyazawa | |
|---|---|---|---|---|
| 10,304,444 | B2 | 5/2019 | Mathias | |
| 2005/0114141 | A1 | 5/2005 | Grody | |
| 2017/0230316 | A1 | 8/2017 | Sharma | |
| 2017/0330479 | A1* | 11/2017 | Bowman | G09B 5/125 |
| 2017/0357478 | A1* | 12/2017 | Piersol | G10L 15/30 |
| 2018/0301151 | A1 | 10/2018 | Mont-Reynaud | |
| 2018/0332340 | A1* | 11/2018 | Ogle | H04N 21/4852 |
| 2020/0251107 | A1* | 8/2020 | Wang | G10L 15/02 |

FOREIGN PATENT DOCUMENTS

| EP | 1374568 A2 | 1/2004 |
|---|---|---|
| WO | 02080531 | 10/2002 |

OTHER PUBLICATIONS

"Samsung Smart TV E-manual", printed on Feb. 18, 2020, 31 pages, <https://www.manualslib.com/manual/784979/Samsung-Smart-Tv.html#>.

Appleinsider Staff, "Amazon Alexa's 'Follow-Up Mode' enables successive requests without trigger word", Mar. 9, 2019, 12 pages.

(Continued)

*Primary Examiner* — Claudia Dragoescu
(74) *Attorney, Agent, or Firm* — Erik Swanson; Andrew M. Calderon; Roberts Calderon Safran & Cole, P.C.

(57) ABSTRACT

Several aspects for resolving a device prompt are described. A processor detects a prompt at a first device connected to a network, wherein the prompt is configured to alert a user proximate to the first device. The prompt may also be configured to solicit one of a plurality of prompt responses from the user. A processor receives a user audio input at a second device connected to the network. A processor determines that the user audio input comprise a first prompt response of the plurality of prompt responses. Once the first prompt response is determined to be included in the user audio input, a processor transmits the first prompt response to the first device. Once received at the first device, a processor executes the first prompt response at the first device to resolve the prompt.

20 Claims, 5 Drawing Sheets

(56) References Cited

OTHER PUBLICATIONS

Campagna et al., "Almond: The Architecture of an Open, Crowdsourced, Privacy-Preserving, Programmable Virtual Assistant", Computer Science Department, Stanford University, Stanford, CA, 2017, 10 pages.

Disclosed Anonymously, "IoT Control Device with Simplified Interface", An IP.com Prior Art Database Technical Disclosure, IP.com No. IPCOM000255196D, IP.com Electronic Publication Date: Sep. 10, 2018, 23 pages.

Disclosed Anonymously, "Method and System for Embedding an Edge Computing Device into an Electrical Receptacle", An IP.com Prior Art Database Technical Disclosure, IP.com No. IPCOM000259937D, IP.com Electronic Publication Date: Sep. 30, 2019, 4 pages.

Disclosed Anonymously, "System and method to prevent virtual assistants to recognize and react to wake-words". An IP.com Prior Art Database Technical Disclosure, IP.com No. IPCOM000259994D, IP.com Electronic Publication Date: Oct. 7, 2019, 4 pages.

Disclosed Anonymously, "User Notification Interface Using Internet of Things Devices", An IP.com Prior Art Database Technical Disclosure, IP.com No. IPCOM000255200D, IP.com Electronic Publication Date: Sep. 10, 2018, 24 pages.

Saba, Elias, "Netflix now supports deep Alexa voice controls on Fire TV devices", AFTVnews, Jun. 24, 2018, 15 pages, <http://www.aftvnews.com/netflix-now-supports-deep-alexa-voice-controls-on-fire-tv-devices/>.

Winkler et al., "Dummy-Based Anonymization for Voice-Controlled IoT Devices", UBICOMM 2018 : The Twelfth International Conference on Mobile Ubiquitous Computing, Systems, Services and Technologies, Copyright (c) IARIA, 2018, ISBN: 978-1-61208-676-7, 8 pages.

* cited by examiner

RESOLVING A DEVICE PROMPT

BACKGROUND

The present invention relates generally to the field of the Internet of Things (IoT), and more particularly to receiving a wake word-less voice input at a device to resolve a device prompt.

Electronic devices have new and emerging capabilities that extend further than only a few years ago. Adding wireless network connectivity to electronic devices has enabled the advent of internet-enabled or internet-connected devices, colloquially called Internet of Things (IoT). IoT refers to the concept of extending internet connectivity beyond conventional computing platforms, such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

The definition of IoT has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the IoT. Smart televisions (TVs) and other IoT devices are internet-enabled and also feature virtual assistants that allow users to interact with the devices via voice commands.

Consumer electronic devices feature pop-up screen notifications that solicit manual user interaction to perform certain tasks. A user may respond to the notification manually or via a virtual assistant. An alarm on a smartphone may sound off with a pop-up notification soliciting manual user input to either stop, silence, or snooze the alarm. The user can select either option by touching the touch screen. A smart TV may be executing a video streaming service when, after a period of time, a pop-up screen notification is displayed asking the user to "continue watching". A user can select the "continue watching" option by selecting the option using the smart TV remote control.

Natural language processing (NLP) engines assist computers in understanding and interpreting human language as it is spoken. NLP engines use two main techniques: syntax and semantic analysis. Syntax is the way in which words are arranged to form a phrase, clause, sentence, or paragraph. Common syntax techniques include parsing, word segmentation, sentence breaking, morphological segmentation, and stemming. NLP engines use syntax to assess the meaning of a word, phrase, clause, sentence, or paragraph. Semantic analysis is used to relate words, phrases, clauses, sentences, or paragraphs to their language-independent meanings. Semantic analysis is performed first by analyzing the context of the word, phrase, clause, sentence, or paragraph in its surrounding text and then by analyzing the structure of the text to identify its proper meaning. Common semantic analysis techniques used by NLP engines include word sense disambiguation, named entity recognition, and natural language generation.

Speech recognition, also known as automatic speech recognition (ASR), refers to the analysis and translation of spoken language into text (e.g., speech-to-text conversion (STT)) by a computer system. An analog-to-digital converter (ADC) is used to translate analog waves of a user's voice into data that a computer can understand. To translate the waves into data, the ADC takes precise measurements of the waves at frequent intervals. The signal produced by the ADC is then divided into short segments that are matched to known phonemes. A phoneme is a perceptually distinct unit of sound that distinguishes one word from another. Once matched, the known phonemes are examined in the context of the surrounding phonemes and compared to a library of known words, phrases, and sentences. Based on the findings of the examination and comparison, the user's spoken words are translated, and a response is produced in the form of text or a computer command.

SUMMARY

Aspects of an embodiment of the present invention disclose a method, computer program product, and computer system for resolving an IoT device prompt display independent of a user wake word input. The method may include executing a program for resolving an IoT device prompt that when executed, by one or more processors, the program may be configured for detecting a prompt at a first IoT device connected to a network. The prompt may be configured to alert a user proximate to the first IoT device. The prompt may also be configured for soliciting one or more input responses from the user that correspond to the prompt. The prompt may be an action button including text images displayed on a user-interface display of the first IoT device.

The program may also receive a user audio input at a second IoT device connected to the network. The program may receive the user audio input at the first IoT device connected to the network. In one embodiment, the first IoT device and the second IoT device may be the same device. The program may be configured for determining that the user audio input includes one of the one or more input responses and executing the one input response at the first IoT device, wherein the input response resolved the prompt.

In another embodiment, the method may include a program configured to disable a wake word requirement of the first IoT device. The program may bypass a wake word requirement immediately after detecting the prompt at the first IoT device until the user audio input is received at the IoT device. The program may also be configured for determining an audible notification is output from a speaker of the first IoT device contemporaneously with detecting the prompt at the first IoT device. The prompt may be associated with the one or more prompt responses, wherein each one of the one or more prompt responses are configured to resolve the prompt.

In another embodiment, the program may include an Automatic Speech Recognition (ASR) engine and a Natural Language Understanding (NLU) engine, which when processing the user audio input are configured to determine that the user audio input comprises the prompt response.

DETAILED DESCRIPTION

Figure 1:
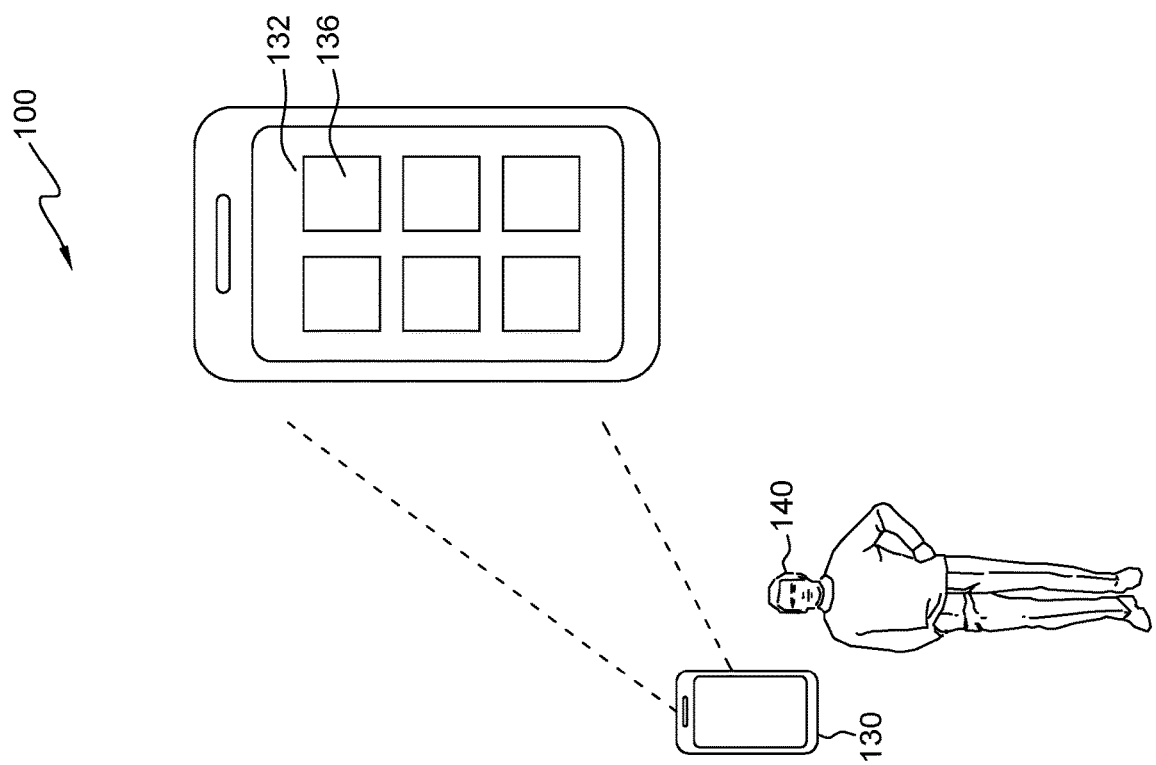
FIG. 1 depicts a block diagram of a distributed data processing environment, in accordance with an embodiment of the present invention.
Figure 1:
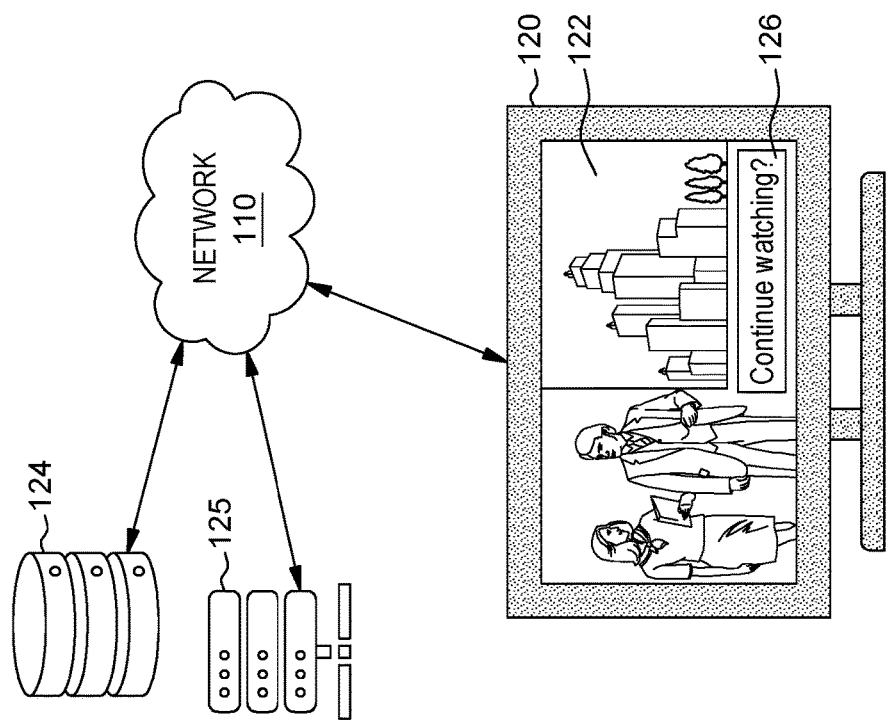

Consumer electronics manufacturers have designed and developed electronic devices to maintain ongoing access to the Internet, which has led to users' increased streaming multimedia content from online content providers. Most online content providers provide content via web-based user-interfaces (e.g., web browser) or software applications (i.e., apps) installed on Internet-connected devices. For example, a content provider may provide an app for users to stream content (e.g., a TV show including a series of consecutive episodes, video blog) on a smart TV, tablet, or smart phone. However, after watching the content for a certain period of time, the content is paused or interrupted while displaying a pop-up notification on the user-interface (e.g., display screen). The pop-up notification usually requests manual input from the user to either continue watching the content or to take some other action. Similarly, a user may set an alarm on a smart phone, which when sounds off provides a pop-up notification requesting manual user interaction to either stop, silence, or snooze the alarm. Embodiments of the present invention recognize that the user would be forced to use the smart TV remote control to respond to the streaming content pop-up notification or to physically interact with their smart phone to respond to the alarm. A solution is needed that allows the user to take the requested action without manually interacting with the primary input device (e.g., smart TV, smart phone) via a remote control or directly with the device itself.

Embodiments of the disclosed invention describe methods for resolving an IoT device prompt. In one embodiment, the method may include detecting a prompt at a first IoT device connected to a network. The prompt may be configured to alert a user proximate to the first IoT device. The prompt may also be configured to solicit one of a plurality of prompt responses from the user. The method may further include receiving a user audio input at a second IoT device connected to the network. Even further, the method may include determining that the user audio input comprise a first prompt response of the plurality of prompt responses. Even further, the method may include transmitting the first prompt response to the first IoT device and executing the first prompt response at the first IoT device to resolve the prompt.

In another embodiment, immediately after detecting the prompt at the first IoT device, the method may further include disabling a wake word requirement of the second IoT device until the user audio input is received at the second IoT device. Alternatively, the method may include bypassing a wake word requirement of the second IoT device.

In yet another embodiment, the prompt may be an action button including text images displayed on a user-interface display of the first IoT device. The action button may include a user-selectable element configured to execute one of the plurality of prompt responses when selected by the user.

In another embodiment, the method may further include providing an audible notification from a speaker of the first IoT device contemporaneously with detecting the prompt at the first IoT device.

In yet another embodiment, the prompt may be associated with one or more of the plurality of prompt responses, wherein each of the one or more of the plurality of prompt responses are configured to resolve the prompt.

Furthermore, according to another embodiment, the user audio input may be determined to include the prompt response based on performing ASR or NLU processing on the user audio input.

The present invention will now be described in detail with reference to the Figures.

FIG. 1 depicts a block diagram of a distributed data processing environment 100 for resolving a device prompt, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes device 120 (also referring to as "first device" 120), device 130 (also referred to as "second device" 130), user 140, database 124, and server(s) 125 interconnected over network 110. Each device 120, 130 may include a display configured to generate a user interface to generate a text image 126, 136 that may be a user-selectable element. Distributed data processing environment 100 may include additional servers, computers, IoT devices, or other computing devices not shown.

Network 110 operates as a computing network that can be, for example, a local area network (LAN), a wide area network (WAN), or a combination of the two, and can include wired, wireless, or fiber optic connections. In an embodiment, network 110 is a private/secure network that may include a firewall (not shown) to block unauthorized access to or from network 110 while permitting outward communication. The firewall can be implemented in either hardware or software form, or a combination of both. In an embodiment, network 110 can be connected to the Internet (not shown) but firewall prevents unauthorized Internet users from accessing network 110. In general, network 110 can be any combination of connections and protocols that will support communications between first device 120, second device 130, and any other network-connected devices not shown.

Device 120 may operate to execute and display user interface 122 for interacting with a user, e.g., user 140, of device 120. In an example embodiment, device 120 may be a smart TV configured to display images from a source and send and/or receive data from network 110 and/or another device connected to network 110. In other embodiments, device 120 may be a laptop computer, tablet computer, netbook computer, personal computer (PC), a desktop computer, a smart phone, smart device, or any programmable electronic device capable of communicating with other computing devices connected to network 110. Device 120 may include components as described in further detail in FIG. 5.

Device 130 may operate to execute and display user interface 132 for interacting with an owner and/or a user, e.g., user 140, of device 130. Device 130 may operate as a voice-controlled device, where a display may not be included in the device components. In an example embodiment, device 130 may be configured to send and/or receive data from network 110 and/or device 120. In some embodiments, device 130 may be a laptop computer, tablet computer, netbook computer, personal computer (PC), a desktop computer, a smart phone, smart device, or any programmable electronic device capable of communicating with other computing devices via network 110. Device 130 may include components as described in further detail in FIG. 5.

Device(s) 120, 130 may include microphone(s), speakers, and/or a display 122, 132. Using the microphone(s), device(s) 120, 130 may capture outgoing audio data and determine a voice command and/or send the outgoing audio data to server(s) 125 to determine the voice command. For example, server(s) 125 may perform ASR processing, NLU processing, and/or command processing to determine the voice command. The voice commands may control device(s) 120, 130, audio devices (e.g., play music over speakers, capture audio using microphones, or the like), multimedia devices (e.g., play videos using a display, such as a television, computer, tablet, or the like), smart home devices (e.g., change temperature controls, turn on/off lights, lock/unlock doors, etc.) or similarly equipped devices.

Device(s) 120, 130 may each be configured to be virtual assistant (VA) compatible or include virtual assistant software. A virtual assistant may be enabled to allow the user 140 to summon the virtual assistant by speaking a wake word followed by a command into a microphone communicatively coupled with the IoT device (e.g., device(s) 120, 130) to perform a task or process.

Device(s) 120, 130 may each be electronic devices configured to determine voice commands using server(s) 125. For example, device 120 may be associated with a first user profile and may send first audio data to server(s) 125. When server(s) 125 receive the first audio data from device 120, server(s) 125 may determine a first voice command represented in the first audio data and may perform a first action corresponding to the first voice command (e.g., execute a first command, send an instruction to the first device 120 and/or other devices to execute the first command, etc.) based on the first user profile. Similarly, device 130 may also be associated with the first user profile and may send second audio data to the server(s) 125, wherein server(s) 125 may determine a second voice command represented in the second audio data and may perform a second action corresponding to the second voice command (e.g., execute a second command, send an instruction to the second device 130 and/or other devices to execute the second command, etc.) based on the first user profile. Without departing from the disclosure, in some embodiments, device(s) 120, 130 may not be associated with a user profile. For example, device(s) 120, 130 may not be associated with a user profile but may execute a software application that is associated with the user profile to execute the embodiments described herein.

In the embodiments described herein, server(s) 125 may be configured for performing multiple functions, but not limited to such embodiments. For example, server(s) 125 may assist device(s) 120, 130 with ASR processing, NLU processing, command processing, generating progress data, saving progress data and/or generating synthesized speech. A single server 125 may be capable of performing all speech processing or multiple server(s) 125 may combine to perform the speech processing. In addition, certain speech detection or command execution functions may be performed by device(s) 120, 130 and/or server(s) 125.

In the depicted embodiment, server(s) 125 may contain program and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with devices 120, 130 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 5.

User interface(s) 122, 132 operate as mobile user interfaces on device(s) 120, 130 through which one or more users of device(s) 120, 130 interact with device(s) 120, 130. In some embodiments, user interface(s) 122, 132 is a graphical user interface (GUI), a web user interface (WUI), and/or a voice user interface (VUI) that can display (i.e., visually), present (i.e., audibly), and/or enable user 140 to enter or receive information (i.e., graphics, text, and/or sound) for or from the one or more processors on device(s) 120, 130 via network 110. In an embodiment, user interface(s) 122, 132 enables user 140 to send and receive data (i.e., to and from one or more processors via network 110, respectively).

Data may be stored in database 124 that is in communication with network 110. Database 124 may operate as a repository for mobile device data, local device data, and other data (e.g., device type profiles, device profiles) that may be associated with mobile device data or local device data. A database is an organized collection of data. Database 124 can be implemented with any type of storage device capable of storing data and configuration files that can be accessed and utilized by device(s) 120, 130, such as a database server, a hard disk drive, or a flash memory. In an embodiment, database 124 may be accessed by device(s) 120, 130 to store and access device data. In the depicted embodiment, database 124 may reside independent of network 110. In another embodiment, database 124 may reside elsewhere within distributed data processing environment 100 provided database 124 has access to network 110.

In another example embodiment, user 140 may be permitted to agree to a terms and service agreement upon setting up computing devices within network 110. The user agreement may document the purpose of the information and data sharing between server(s) 125 and device(s) 120, 130 and provide access to the devices on network 110 that have been designated for participation in network 110. The user agreement may include all mentioned passing devices that would allow control(s), trigger(s), or action(s) to be executed based on the user's original request. For networks with multiple users and multiple computing devices, the system may extend the usage agreement to a defined or dynamic group, upon a second user 140 joining said group.

Figure 2:
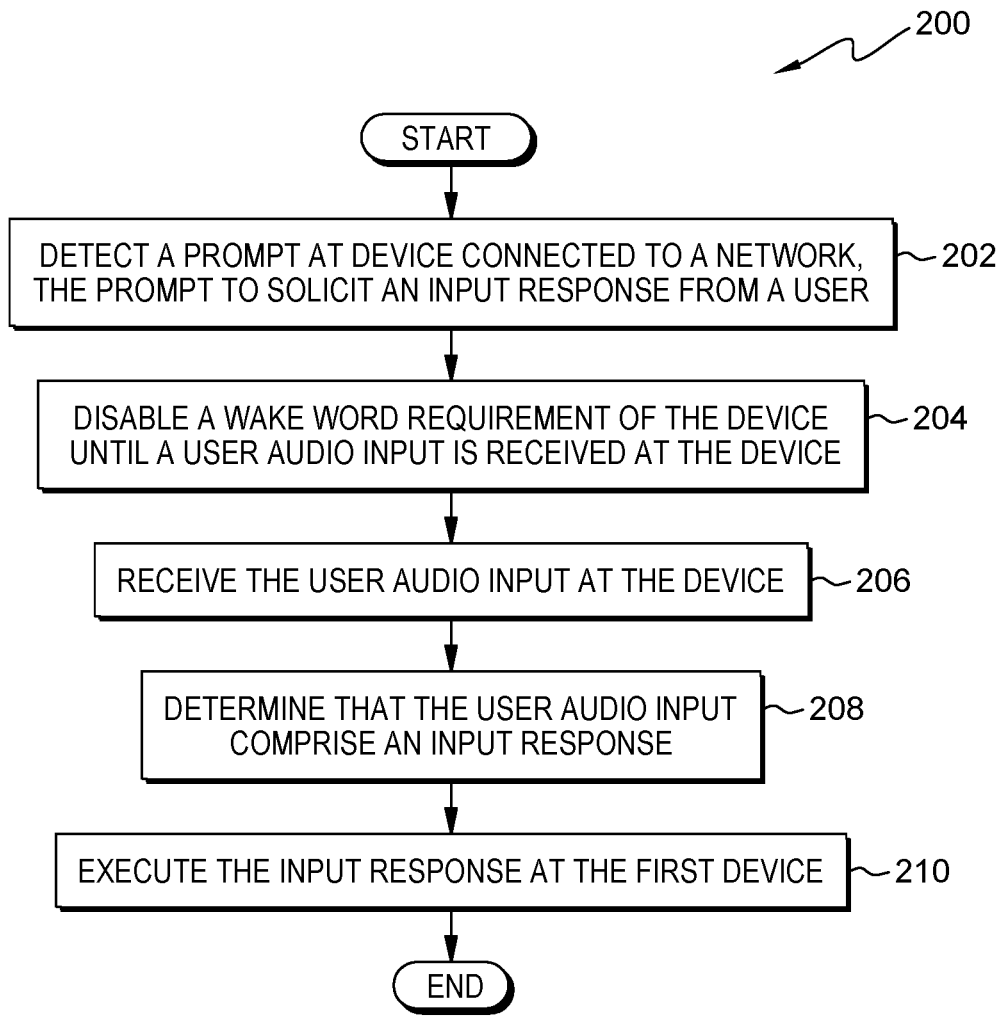
FIG. 2 depicts a flowchart of a method for resolving an IoT device prompt, in accordance with an embodiment of the present invention.

FIG. 2 depicts a flowchart of method 200 for resolving a device prompt, in accordance with an embodiment of the present invention. In one embodiment, method 200 may include a program stored in server(s) 125 or one or more computer memory components, which when executed by one or more processors may be configured for detecting 202 a prompt at device 120 connected to network 110. The prompt may be configured to alert user 140 proximate to device 120. The prompt may be a message or image including text images 126 communicating information to be read by user 140. The prompt may also be an action button including text images 126 displayed on a user-interface display of device 120. The action button may include user-selectable element text image 126 configured to execute one of a plurality of prompt responses when selected by the user 140.

For example, in the context of an internet-based video streaming on a website or a software application, the prompt may be a graphical image including the user-selectable text image 126 labeled "skip" or "skip ad(s)", wherein if selected by user 140, using a cursor or pointer, the selection would perform a certain action (e.g., skip the advertisement that is playing on the screen) corresponding to the prompt. As another example, the prompt may be a graphical image including the user-selectable text image 126 "continue watching", or "next episode", wherein if selected by user 140, then the selection would perform the action (e.g., continue watching the current episode or play the next episode).

The prompt may also be configured to solicit one of a plurality of prompt responses from user 140. The plurality of prompt responses may include intelligent, logical responses available for user 140 to select from the prompt displayed on the user-interface or display screen. For example, if the prompt is user-selectable text image 126 "continue watching?", the plurality of prompt responses may include "yes", "no", or "continue watching". The prompt may solicit any of those prompt responses or any other prompt response that include a natural response to the prompt. In this embodiment, if user 140 response includes the "yes" user selection, then that selection would be an acceptable response of the plurality of prompt responses. Thus, any of those natural examples may be included in the plurality of prompt responses.

In an embodiment, method 200 may include the program configured for disabling 204 a wake word requirement for device 120, wherein the wake word requirement is a threshold preliminary step to access device 120 virtual assistant features. For example, device 120 may be configured for detecting a specific word or phrase via a microphone of device 120 to awaken device 120 from a listening or idle mode. Once device 120 is awaken, device 120 may then listen for a command from the user, wherein the command instructs device 120 to perform an action or a specific task. In other words, the virtual assistant features are enabled after receiving the wake word. Alternatively, instead of disabling 204 the wake word requirement, the program may be configured for bypassing the wake word requirement of device 120, if any exist, such that device 120 automatically transitions out of the listening or idle mode after detecting the prompt and automatically begins listening for a command or a specific task spoken by the user 140.

In an embodiment, method 200 may further include the program receiving 206 a user audio input at device 120. Device 120 may include a microphone configured to detect audio signals proximate to device 120. Once detected, the microphone converts the audio signals to audio data and transmits the audio data to server(s) 125 via network 110 for additional processing. Therefore, the program may be configured for receiving the user audio input at device 120 as audio data.

In an embodiment, method 200 may include the program determining 208 that the user audio input comprises a prompt response of the plurality of prompt responses. The program may be configured for converting the user audio input from an audio signal to audio data, wherein the audio data may be a text representation of the audio signal. The text representation of the audio signal may be included in the audio data. The program may be configured for processing the audio data using an ASR engine to recognize that the audio data is speech made by user 140. Further, the program may be configured for further processing the audio data using an NLU engine to determine the intent of the speech made by the user. Furthermore, the program may be configured for determining if the audio data corresponds to one of the plurality of prompt responses as described above herein. For example, the program may compare the audio data derived from the user audio input to data corresponding to the plurality of prompt responses to determine if a match exists. If the program determines a match exists, then the program may be configured to perform an action corresponding to the prompt response, as further described below. If the program determines that a match does not exist, the program may be configured to return an error message or solicit an additional response from user 140.

In an embodiment, a prompt response may be any intelligent or logical response to a prompt displayed on a device, as described in this disclosure. For example, if a prompt is "continue watching", then an intelligent and/or logical prompt response to that prompt may be "yes", "no", "exit" or "ignore". Further, if a prompt is "next episode|watch credits", a prompt response to that prompt may be "yes", "no", "next episode", or "watch credits". Even further, if a prompt is an alarm notification coupled with an audible alert on a mobile device, a smartphone, or a tablet, the prompt response may be to "snooze" for a period of time or "stop" the alarm. Any intelligent and/or logical response to a prompt displayed on a user-interface or screen may be included in the plurality of prompt responses. Therefore, each prompt that is detectable by the program is associated with corresponding prompt responses.

In an embodiment, method 200 may further include the program configured for executing 210 the prompt response at device 120 to resolve the prompt. As mentioned above herein, each prompt response includes a corresponding action to be performed at the device 120. For example, if the prompt response was "continue watching", then the action may include "continue watching" an episode, wherein executing that action includes the program selecting the "continue watching" user-selectable icon or text image 126 and the currently streaming or currently paused episode may continue to play on device 120. In another example, if the prompt response was "snooze", then the action may include a "snooze" feature for an alarm on a smart phone, wherein executing that action includes the program selecting the "snooze" user-selectable icon 136 thereby silencing the alarm for a finite period of time. Therefore, executing the prompt response may include the program performing the action corresponding to the prompt response at the device 120.

In an embodiment, method 200 may further include providing an audible notification from a speaker of device 120 contemporaneously with detecting the prompt at device 120. For example, device 120 may include a speaker that outputs an alert or audible alarm at the same time when the prompt is detected. Providing an audible alert at the same time as detecting the prompt may increase the likelihood that user 140 will be alerted to the prompt in order to solicit a quicker user response.

In an embodiment, the prompt may be associated with one or more of the plurality of prompt responses, wherein each of the one or more of the plurality of prompt responses are configured to resolve the prompt. For example, if the prompt is an alarm notification, then the alarm notification prompt may be associated with a "snooze" prompt response, a "stop" prompt response or a "cancel" prompt response. Nonetheless, more than one prompt response may be associated with an individual prompt.

Figure 3:
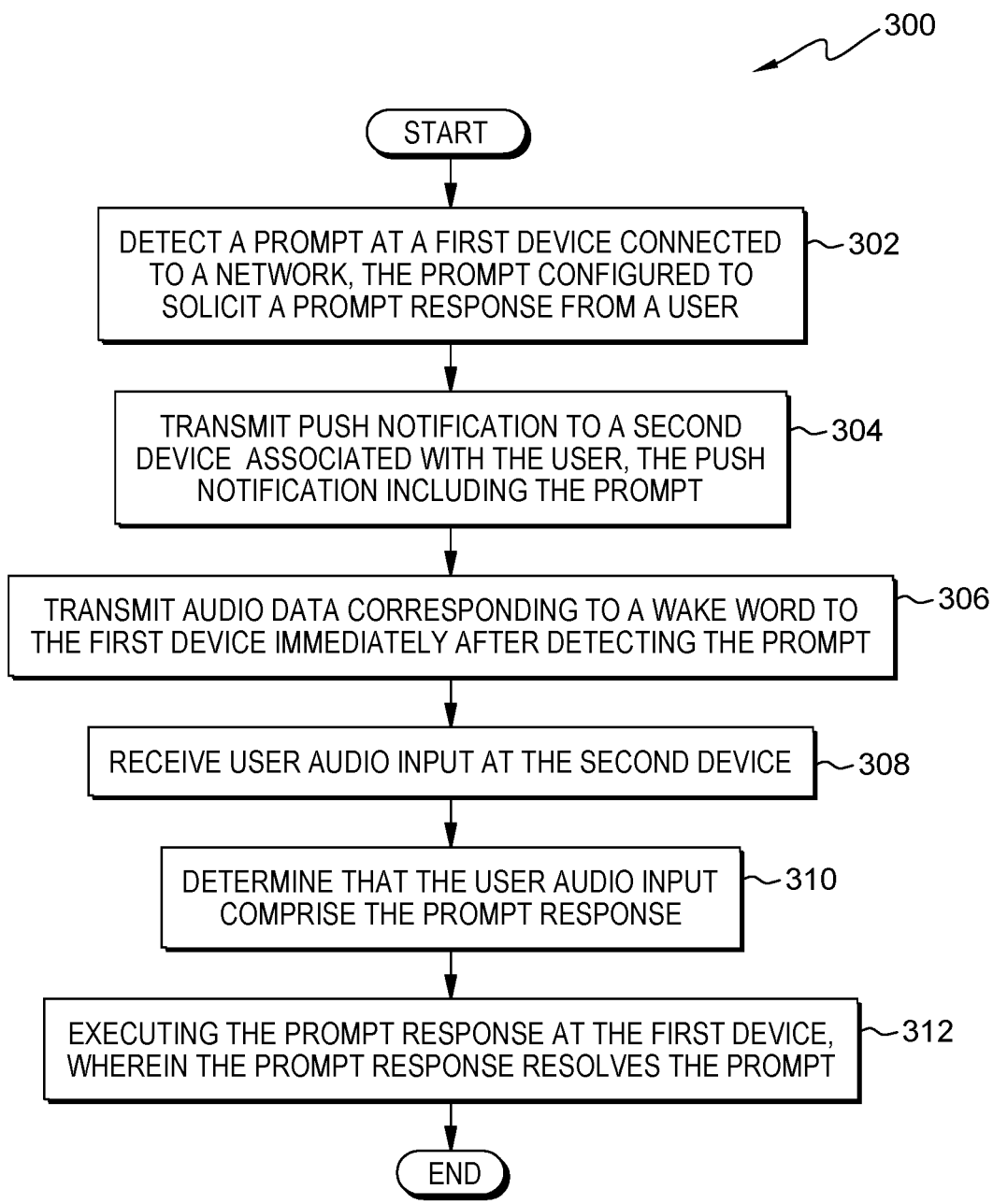
FIG. 3 depicts a flowchart of another method for resolving an IoT device prompt, in accordance with an embodiment of the present invention.

FIG. 3 depicts a flowchart of a method 300 for resolving a device prompt, in accordance with an embodiment of the present invention. In one embodiment, method 300 may include a program stored in server(s) 125 or one or more computer memory components, which when executed by one or more processors may be configured for detecting 302 a prompt at a first device 120 connected to a network 110. The prompt may be configured to alert user 140 proximate to first device 120. The prompt may be a message or image including text images 126, 136 communicating information to be read by user 140. The prompt may also be an action button including text images 126, 136 displayed on a user-interface display of first device 120. The action button may include a user-selectable element text image 126, 136 configured to execute one of the plurality of prompt responses when selected by user 140.

Method 300 may further include the program configured for transmitting 304 a push notification to a second device (e.g., second device 130). The push notification may include information corresponding to the prompt detected at first device 120.

Method 300 may further include the program configured for transmitting 306 audio data corresponding to a wake word to first device 120 immediately after detecting the prompt at first device 120. For example, if a prompt is detected at first device 120, then program may transmit audio data or electronic data corresponding to a wake word that is compatible with first device 120 to first device 120. Once first device 120 receives the audio data or electronic data corresponding to the compatible wake word, first device may be configured for receiving user audio input from user 140 without requiring a wake word from user 140 prior to receiving the prompt response. The program may also be configured for transmitting 306 audio data or electronic data corresponding to a wake word that is compatible with second device 130 to second device 130, if the program determines that second device is within a closer proximity to user 140 than first device 120. Similar to first device 120, once second device 130 receives the audio data or electronic data corresponding to the compatible wake word, second device may be configured for receiving user audio input from user 140 without requiring a wake word from user 140 prior to receiving the prompt response.

In an embodiment, method 300 may further include the program receiving 308 a user audio input at second device 130. Second device 130 may include a microphone configured to detect audio signals proximate to second device 130. Once detected, the microphone converts the audio signals to audio data and transmits the audio data to one or more processors for additional processing. Therefore, the program may be configured for receiving the user audio input at second device 130 as audio data.

In an embodiment, method 300 may include the program determining 310 that the user audio input comprises a prompt response of a plurality of prompt responses as described above herein.

In an embodiment, method 300 may include the program executing 312 the prompt response at first device 120, wherein the prompt response resolves the prompt, as described above herein.

Figure 4:
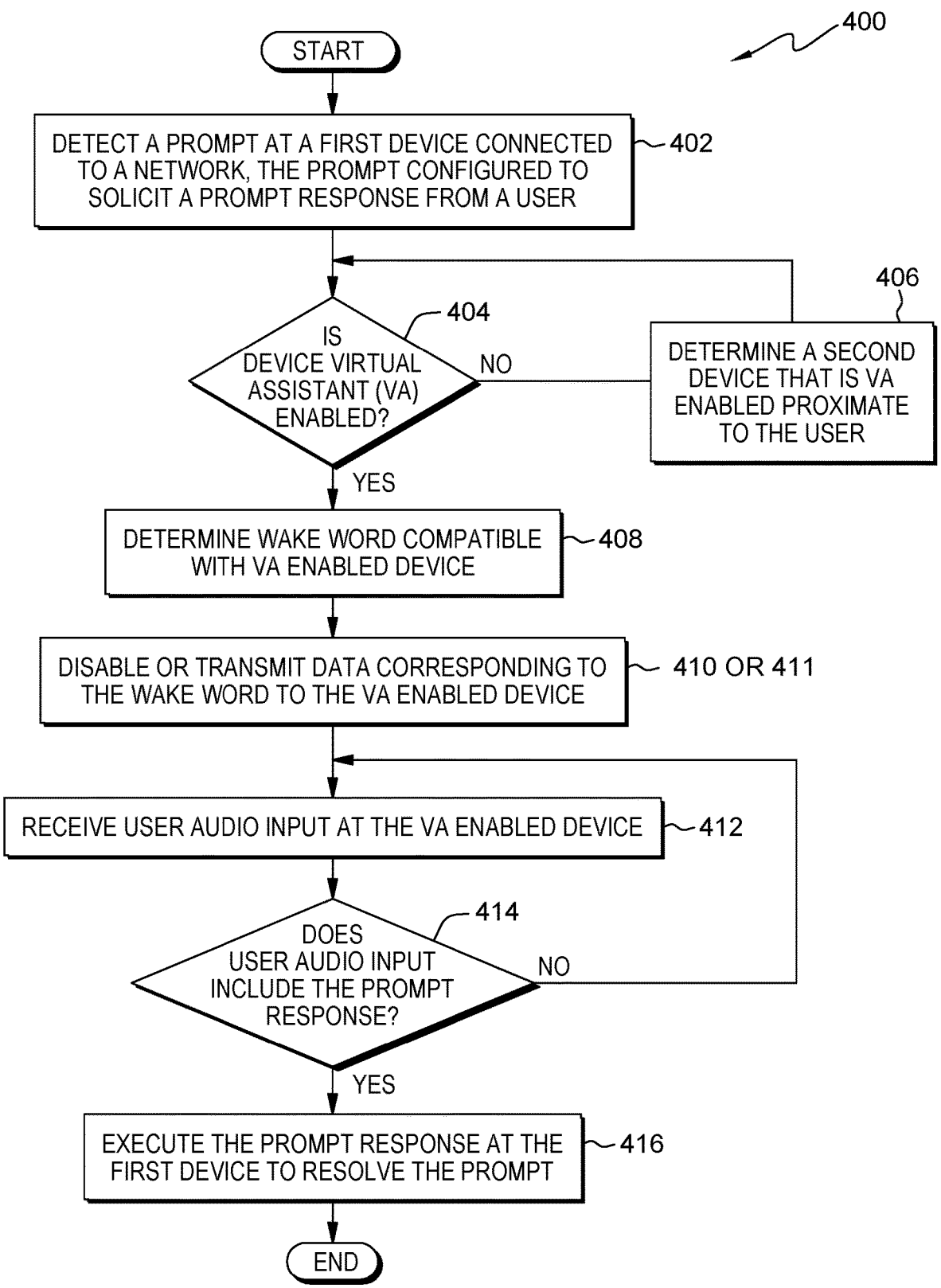
FIG. 4 depicts a flowchart of yet another method for resolving an IoT device prompt, in accordance with an embodiment of the present invention.

FIG. 4 depicts a flowchart of a method 400 for resolving a device prompt, in accordance with yet another embodiment of the present invention. In one embodiment, method 400 may include a program stored in one or more computer memory components, which when executed by one or more processors may be configured for detecting 402 a prompt at first device 120 connected to network 110. The prompt may be configured to alert user 140 proximate to first device 120. The prompt may be a message or image including text images 126 displaying information to be read by user 140. The prompt may also be an action button including text images 126 displayed on a user-interface display of first device 120. The action button may include a user-selectable element 126 configured to execute one of the plurality of prompt responses when selected by user 140.

In an embodiment, method 400 may include the program configured for determining 404 if first device 120 is virtual assistant (VA) or voice control (VC) enabled. For example, the program may perform a query on first device 120 to access identification information about first device 120. Identification information may include device capabilities and device features indicating whether first device 120 is virtual assistant/voice control enabled or not, or other capabilities or features. If the program determines that first device 120 is not VA/VC enabled, then the program may determine 406 if second device 130 proximate to first device 120 is VA/VC enabled. The program may continue searching for additional devices proximate to first device 120 to determine if any one of the additional devices are VA/VC enabled until at least one is found. If no VA/VC enabled device is found, the program may return an error message or simply ignore the detected prompt and await user manual input.

In an embodiment, if the program determines 404 that first device 120 or second device 130 or any additional device is VA/VC enabled, then method 400 may include the program configured to determine 408 a wake word compatible with the VA or the VA/VC device. Again, as mentioned above, the program may query the device identification information to determine device capabilities and device features to determine which wake word is associated with the VA/VC capability. For example, a VA/VC enabled device may be associated with a word or phrase, which when detected by a device microphone, is configured to transition the device from a sleep or listening mode to a live mode or a listen for command mode.

In an embodiment, if the program determines the wake word compatible with the VA/VC enabled device, then method 400 may further include the program disabling 410 the VA/VC enabled device wake word requirement until a prompt response is received at the VA/VC enabled device. Alternatively, if the program determines the wake word compatible with the VA/VC enabled device, then the method 400 may further include the program transmitting 411 data corresponding to the wake word to the VA/VC enabled device until a prompt response is received at the VA/VC enabled device. Either way, the disabling 410 or transmitting 411 steps removes the barrier of requiring user 140 to utter a wake word to speak a command into the VA/VC enabled device in order to respond to the prompt detected at first device 120.

In an embodiment, once the program circumvents the wake word barrier, method 400 may include the program receiving 412 user audio input at the VA/VC enabled device, as described above herein. If the program does not receive user audio input at the VA/VC enabled device, the program may continue waiting to receive user audio input until a predetermined time has expired.

In an embodiment, method 400 may include the program determining 414 if the user audio input includes a prompt response of a plurality of prompt responses, as described above herein. If the program does not determine that the user audio input includes a prompt response, then the program may continue to receive 412 user audio input until a predetermined time has expired.

In an embodiment, method 400 may include the program executing 416 the prompt response at first device 120 to resolve the prompt, as described above herein.

Figure 5:
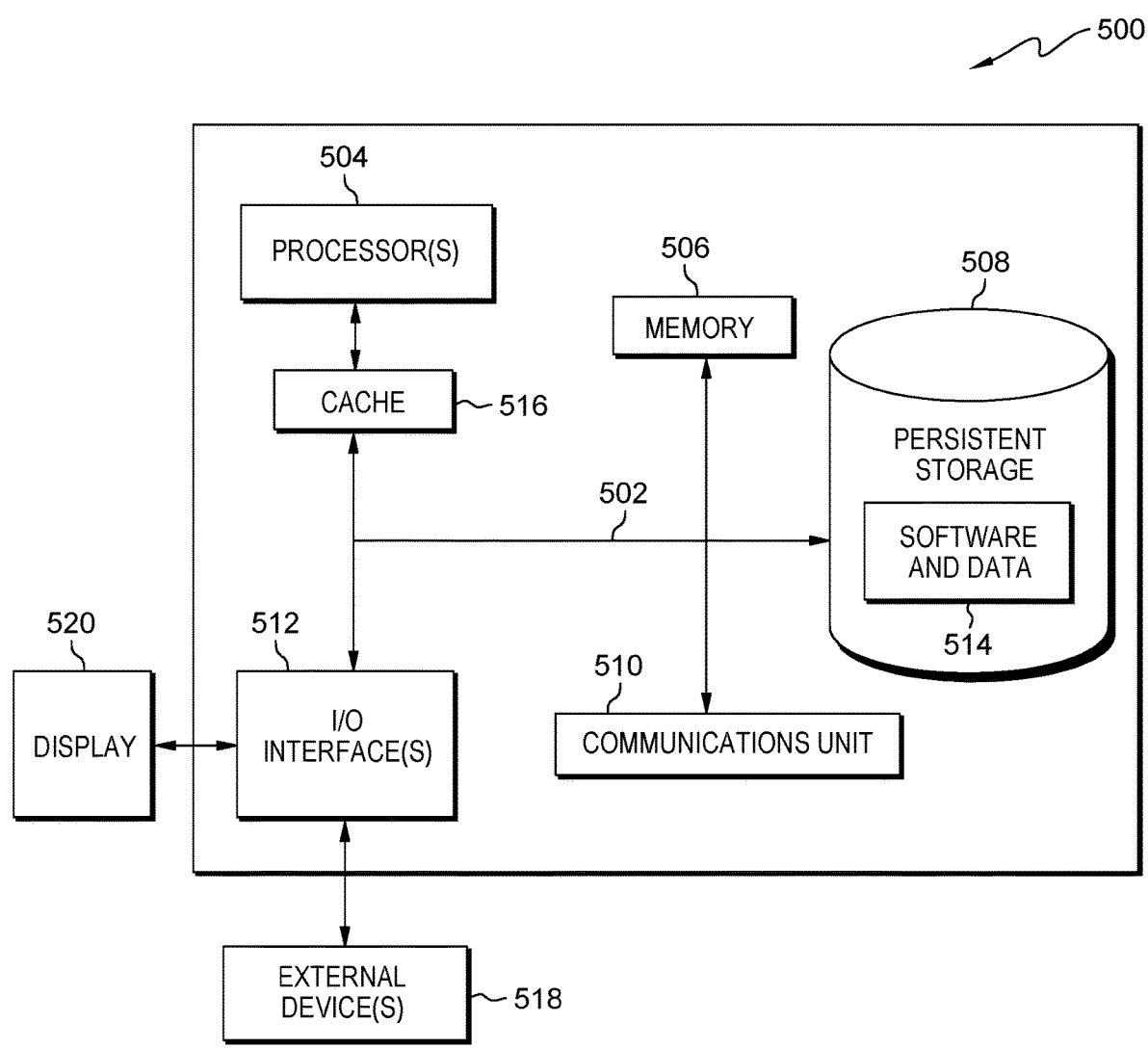
FIG. 5 depicts a block diagram of a computing device, in accordance with an embodiment of the present invention.

FIG. 5 depicts a block diagram of computer 500 suitable for server(s) 125, device 120, and device 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to device 120 and device 130. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for resolving a device prompt, the computer-implemented method comprising:

detecting, by one or more processors, a prompt at a first device connected to a network, wherein the prompt is configured to alert a user proximate to the first device and solicit one of a plurality of prompt responses from the user;

responsive to detecting the prompt at the first device, disabling, by the one or more processors, a wake word requirement of a second device until the user audio input is received from the user at the second device;

receiving, by the one or more processors, a user audio input from the user at the second device connected to the network;

determining, by the one or more processors, that the user audio input comprises a first prompt response of the plurality of prompt responses;

transmitting, by the one or more processors, the first prompt response to the first device; and executing, by the one or more processors, the first prompt response at the first device to resolve the prompt.

2. The computer-implemented method of claim 1, wherein the prompt is an action button including text images displayed on a user-interface display of the first device.

3. The computer-implemented method of claim 2, wherein the action button includes a user-selectable element configured to execute one of the plurality of prompt responses.

4. The computer-implemented method of claim 1, further comprising:

providing, by the one or more processors, an audible notification from a speaker of the first device contemporaneously with detecting the prompt at the first device.

5. The computer-implemented method of claim 1, wherein the prompt is associated with one or more of the plurality of prompt responses, wherein each of the one or more of the plurality of prompt responses are configured to resolve the prompt.

6. The computer-implemented method of claim 1, wherein the user audio input is determined to comprise the prompt response based on performing ASR or NLU on the user audio input.

7. A computer program product for resolving a device prompt, the computer program product comprising:

one or more computer readable storage media and program instructions stored on the one or more computer readable storage media, the program instructions comprising:
  program instructions to detect a prompt at a first device connected to a network, wherein the prompt is configured to alert a user proximate to the first device and configured to solicit one of a plurality of prompt responses from the user;
  program instructions to disable a wake word requirement of a second device until the user audio input is received from the user at the second device;
  program instructions to receive a user audio input from the user at the second device connected to the network;
  program instructions to determine that the user audio input comprise a first prompt response of the plurality of prompt responses;
  program instructions to transmit the first prompt response to the first device; and
  program instructions to execute the first prompt response at the first device to resolve the prompt.

8. The computer program product of claim 7, wherein the prompt is an action button including text images displayed on a user-interface display of the first device.

9. The computer program product of claim 8, wherein the action button is a user-selectable element configured to execute one of the plurality of prompt responses.

10. The computer program product of claim 7, further comprising providing an audible notification from a speaker of the first device contemporaneously with detecting the prompt at the first device.

11. The computer program product of claim 7, wherein the prompt is associated with one or more of the plurality of prompt responses, wherein each of the one or more of the plurality of prompt responses are configured to resolve the prompt.

12. The computer program product of claim 7, wherein the user audio input is determined to comprise the prompt response based on performing ASR or NLU on the user audio input.

13. A computer system for resolving a device prompt, the computer system comprising:
  one or more computer processors;
  one or more computer readable storage media;
  program instructions stored on the one or more computer readable storage media for execution by at least one of the one or more processors, the program instructions comprising:
    program instructions to detect a prompt at a first device connected to a network, wherein the prompt is configured to alert a user proximate to the first device and configured to solicit one of a plurality of prompt responses from the user;
    program instructions to disable a wake word requirement of a second device until the user audio input is received from the user at the second device;
    program instructions to receive a user audio input from the user at the second device connected to the network;
    program instructions to determine that the user audio input comprise a first prompt response of the plurality of prompt responses;
    program instructions to transmit the first prompt response to the first device; and
    program instructions to execute the first prompt response at the first device to resolve the prompt.

14. The computer system of claim 13, wherein the prompt is an action button including text images displayed on a user-interface display of the first device.

15. The computer system of claim 14, wherein the action button is a user-selectable element configured to execute one of the plurality of prompt responses.

16. The computer system of claim 13, wherein the prompt is associated with one or more of the plurality of prompt responses, wherein each of the plurality of prompt responses are configured to resolve the prompt.

17. The computer system of claim 13, wherein the user audio input is determined to comprise the prompt response based on performing ASR or NLU on the user audio input.

18. The computer-implemented method of claim 1, further comprising:
  responsive to determining that the second device is within a closer proximity to the user than the first device, transmitting, by the one or more processors, audio data corresponding to a wake word that is compatible with the second device to the second device.

19. The computer program product of claim 7, further comprising:
  responsive to program instructions to determine that a second device is within a closer proximity to the user than the first device, transmitting audio data corresponding to a wake word that is compatible with the second device to the second device.

20. The computer system of claim 13, further comprising:
  responsive to program instructions to determine that a second device is within a closer proximity to the user than the first device, transmitting audio data corresponding to a wake word that is compatible with the second device to the second device.

* * * * *